US012700543B2

(12) United States Patent
Lee et al.

(10) Patent No.: US 12,700,543 B2
(45) Date of Patent: Aug. 4, 2026

(54) MULTILAYER CAPACITOR INCLUDING EXTERNAL ELECTRODE HAVING CONDUCTIVE RESIN LAYER WITH THICKNESS REDUCED IN PART

(71) Applicant: SAMSUNG ELECTRO-MECHANICS CO., LTD., Suwon-si (KR)

(72) Inventors: Chaedong Lee, Suwon-si (KR); Seung Ah Kim, Suwon-si (KR); Gyuho Yeon, Suwon-si (KR); Byungjun Jeon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 74 days.

(21) Appl. No.: 18/442,627

(22) Filed: Feb. 15, 2024

(65) Prior Publication Data

US 2024/0339266 A1 Oct. 10, 2024

(30) Foreign Application Priority Data

Apr. 4, 2023 (KR) ......................... 10-2023-0044182

(51) Int. Cl.
*H01G 4/232* (2006.01)
*H01G 4/30* (2006.01)
(52) U.S. Cl.
CPC ............. *H01G 4/2325* (2013.01); *H01G 4/30* (2013.01)
(58) Field of Classification Search
CPC ......... H01G 4/30; H01G 4/232; H01G 4/2325
See application file for complete search history.

(56) References Cited

U.S. PATENT DOCUMENTS

| | | | |
|---|---|---|---|
| 10,971,306 B2 | 4/2021 | Onodera et al. | |
| 11,264,171 B2 | 3/2022 | Nagai et al. | |

(Continued)

FOREIGN PATENT DOCUMENTS

| | | | | |
|---|---|---|---|---|
| JP | 2017028229 A | * | 2/2017 | |
| JP | 2017-108057 A | | 6/2017 | |

(Continued)

OTHER PUBLICATIONS

Extended European Search Report dated Jun. 10, 2025, issued in corresponding European Patent Application No. 24164508.4.

*Primary Examiner* — David M Sinclair
(74) *Attorney, Agent, or Firm* — Morgan, Lewis & Bockius LLP

(57) ABSTRACT

A multilayer capacitor includes a capacitor body including a first internal electrode and a second internal electrode stacked with a dielectric layer interposed therebetween, the capacitor body having a first surface and a second surface opposite each other and a third surface extending between the first and second surfaces; and an external electrode including a connection portion disposed at the third surface, and a band portion extending from the connection portion to the first surface and the second surface. The external electrode includes a base electrode in contact with the capacitor body, and a conductive resin layer disposed to cover the base electrode at least partially. A thickness of the conductive resin layer at an end part of the base electrode on the first surface and a thickness of the conductive resin layer at an end part of the base electrode on the second surface are different from each other.

16 Claims, 6 Drawing Sheets

(56)     References Cited

U.S. PATENT DOCUMENTS

| | | | |
|---|---|---|---|
| 2012/0300361 A1* | 11/2012 | Togashi | H01G 4/12 |
| | | | 156/89.12 |
| 2016/0005539 A1 | 1/2016 | Lee et al. | |
| 2017/0098505 A1 | 4/2017 | Ando et al. | |
| 2017/0098506 A1 | 4/2017 | Ando et al. | |
| 2017/0169954 A1 | 6/2017 | Ota et al. | |
| 2018/0151296 A1 | 5/2018 | Yamada | |
| 2019/0096576 A1 | 3/2019 | Onodera et al. | |
| 2019/0287720 A1 | 9/2019 | Mori et al. | |
| 2020/0043659 A1 | 2/2020 | Kim et al. | |
| 2020/0075247 A1* | 3/2020 | Kim | H01G 4/2325 |
| 2021/0057161 A1 | 2/2021 | Zenzai et al. | |
| 2022/0139618 A1 | 5/2022 | Kang et al. | |
| 2022/0139626 A1 | 5/2022 | Cho | |
| 2023/0014803 A1 | 1/2023 | Watanabe | |

FOREIGN PATENT DOCUMENTS

| | | | | |
|---|---|---|---|---|
| JP | 2018-088451 A | 6/2018 | | |
| JP | 2021-034433 A | 3/2021 | | |
| JP | 7107712 B2 | 7/2022 | | |
| WO | WO-2016208633 A1 * | 12/2016 | | H01G 4/30 |

* cited by examiner

MULTILAYER CAPACITOR INCLUDING EXTERNAL ELECTRODE HAVING CONDUCTIVE RESIN LAYER WITH THICKNESS REDUCED IN PART

CROSS-REFERENCE TO RELATED APPLICATION

This application claims priority to and the benefit of Korean Patent Application No. 10-2023-0044182 filed in the Korean Intellectual Property Office on Apr. 4, 2023, the entire contents of which are incorporated herein by reference.

TECHNICAL FIELD

The present disclosure relates to a multilayer capacitor.

BACKGROUND

Multilayer capacitors may be small and realize high-capacity, so they are used in various electronic devices. As various electronic devices such as computers and mobile devices are down-sized and high-powered, the demand for down-size and high-capacity for multilayer capacitors is increasing, and high reliability and high-strength characteristics are required.

In order to secure high reliability and high strength characteristics, a capacitor with a two-layer structure of an electrode layer and a conductive resin layer is being manufactured as an external electrode composed of an existing electrode layer.

However, when the conductive resin layer is stacked on the electrode layer, there is a problem that an equivalent series resistance (ESR) increases, and the external electrode also requires a higher level of a bending strength characteristic than the current one.

SUMMARY

One aspect of the exemplary embodiment is to provide a multilayer capacitor that suppresses a chip crack generation by lowering an equivalent series resistance (ESR) and improving a bending strength without compromising a productivity and an economic feasibility.

However, the problem to be solved by the exemplary embodiments may be variously extended in the range of technical ideas included in the present invention without being limited to the above-described problem.

A disclosed multilayer capacitor according to an exemplary embodiment includes a capacitor body including a dielectric layer, and a first internal electrode and a second internal electrode stacked in a thickness direction with the dielectric layer interposed therebetween, a length direction vertical to the thickness direction, and a width direction vertical to the thickness direction and the length direction, the capacitor body having a first surface and a second surface opposite each other in the thickness direction, and a third surface and a fourth surface opposite each other in the length direction; and first and second external electrodes respectively including a connection portion disposed at the third surface and the fourth surface of the capacitor body, and a band portion extending from the connection portion to the first surface and the second surface. The first and second external electrodes include a base electrode in contact with the surface of the capacitor body, and a conductive resin layer disposed to cover the base electrode at least partially, respectively. A thickness of the conductive resin layer at an end part of the base electrode on the first surface measured in a vertical direction with respect to the first surface, and a thickness of the conductive resin layer at an end part of the base electrode on the second surface measured in a vertical direction with respect to the second surface are different from each other.

A length of the band portion on the first surface measured in the length direction may be greater than or equal to a length of the band portion on the second surface measured in the length direction.

The thickness of the conductive resin layer at the end part of the base electrode on the first surface measured in the vertical direction with respect to the first surface may be thicker than the thickness of the conductive resin layer at the end part of the base electrode on the second surface measured in the vertical direction with respect to the second surface.

The connection portion of the first or second external electrode may include a lower portion close to the first surface and an upper portion close to the second surface, bounded by a middle point between the first surface and the second surface. A thickness of the lower portion measured in a vertical direction with respect to the third or fourth surface where the first or second external electrode is disposed and a thickness of the upper portion measured in the vertical direction with respect to the third or fourth surface where the first or second external electrode is disposed may be different from each other.

The connection portion of the first or second external electrode may include quarters between the first surface and the second surface, and a thickness of the connection portion of the first or second external electrodes at a quarter point close to the first surface may be thicker than a thickness of the connection portion of the first or second external electrode at another quarter point close to the second surface.

The connection portion may have a part having a thickness increasing from the upper portion to the lower portion.

A thickness of the conductive resin layer of the lower portion measured in the vertical direction with respect to the third or fourth surface where the first or second external electrode is disposed and a thickness of the conductive resin layer of the upper portion measured in the vertical direction with respect to the third or fourth surface where the first or second external electrode is disposed may be different from each other.

The conductive resin layer of the connection portion may include quarters between the first surface and the second surface, and the conductive resin layer of the connection portion is thicker at a quartering point close to the first surface than at a quartering point close to the second surface.

The conductive resin layer of the connection portion may have a portion having a thickness increasing from the upper portion to the lower portion.

A length of the conductive resin layer of the band portion at the first surface measured in the length direction may be greater than or equal to a length of the conductive resin layer of the band portion at the second surface measured in the length direction.

The thickness of the conductive resin layer at the end part of the base electrode on the first surface may be thicker than 1.5 times and thinner than or equal to 2 times of the thickness of the conductive resin layer at the end part of the base electrode on the second surface.

The conductive resin layer has a thickness at a quartering point close to the first surface more than twice as a thickness at a quartering point close to the second surface and less than or equal to three times as thin as the thickness at the quartering point close to the second surface.

The conductive resin layer may include conductive metal particles dispersed in a resin.

The base electrode may include a conductive metal and glass.

A manufacturing method of a multilayer capacitor according to another exemplary embodiment includes forming first and second conductive paste layers on first and second dielectric green sheets, respectively; stacking the first and second dielectric green sheets to form a dielectric green sheet stack; sintering the dielectric green sheet stack to manufacture a capacitor body; forming a base electrode on one surface of the capacitor body; applying a paste for resin layer including polymer resin and conductive metal on the base electrode; and curing the paste for resin layer by tilting the capacitor body applied with the paste for resin layer so that a dielectric layer in the sintered capacitor body intersects with the direction of gravity.

The curing of the paste for resin layer may include curing by tilting the dielectric layer perpendicular to the direction of gravity.

The paste for resin layer may be applied by dipping the capacitor body on which the base electrode is formed into a paste including epoxy resin and conductive metal particles.

The curing of the paste for resin layer may include controlling a drying angle, a drying temperature, a drying time, or a temperature holding time.

A disclosed multilayer capacitor according to an exemplary embodiment includes a capacitor body including a dielectric layer, and a first internal electrode and a second internal electrode stacked in a thickness direction with the dielectric layer interposed therebetween, a length direction vertical to the thickness direction, and a width direction vertical to the thickness direction and the length direction, the capacitor body having a first surface and a second surface opposite each other in the thickness direction, and a third surface and a fourth surface opposite each other in the length direction; and first and second external electrodes respectively including a connection portion disposed at the third surface and the fourth surface of the capacitor body, and a band portion extending from the connection portion to the first surface and the second surface. The first and second external electrodes comprise a base electrode in contact with the surface of the capacitor body, and a conductive resin layer disposed to cover the base electrode at least partially and extending at least on portions of the first surface and the second surface, respectively. The connection portion of the first or second external electrode includes a lower portion close to the first surface and an upper portion close to the second surface, bounded by a middle point between the first surface and the second surface. A thickness of the conductive resin layer of the lower portion measured in a vertical direction with respect to the third or fourth surface where the first or second external electrode is disposed and a thickness of the conductive resin layer of the upper portion measured in the vertical direction with respect to the third or fourth surface where the first or second external electrode is disposed are different from each other.

The thickness of the conductive resin layer of the lower portion measured in the vertical direction with respect to the third or fourth surface where the first or second external electrode is disposed may be greater than the thickness of the conductive resin layer of the upper portion measured in the vertical direction with respect to the third or fourth surface where the first or second external electrode is disposed.

According to the multilayer capacitor according to the exemplary embodiment, it is possible to increase the thickness of the conductive resin layer in the desired part with a minimum process without additional material consumption or increase in production time, thereby strength while maintaining a improving the bending productivity and an economic feasibility.

At the same time, the equivalent series resistance (ESR) may be reduced by reducing the thickness of the conductive resin layer in the part that does not contribute to the improvement of the bending strength.

However, it is clear that the effects of the exemplary embodiments are not limited to the above-described effects, and can be variously extended within a range that does not deviate from the spirit and region of the present invention.

DETAILED DESCRIPTION OF THE EMBODIMENTS

Figure 1:
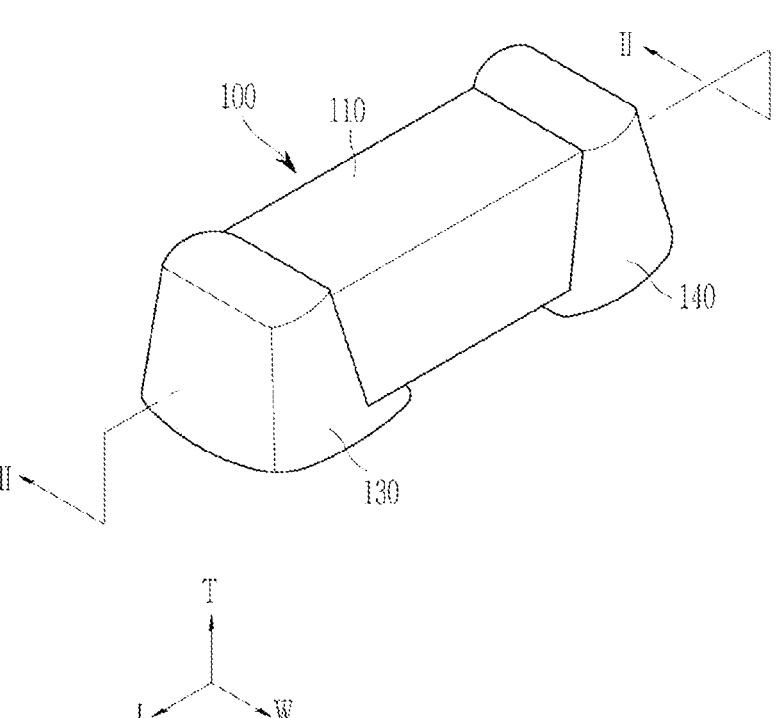
FIG. 1 is a perspective view showing an appearance of a multilayer capacitor according to an exemplary embodiment.

Hereinafter, an embodiment of the present invention will be described in detail and thus a person of an ordinary skill in the technical field to which the present invention belongs can easily implement it with reference to the accompanying drawing. The drawings and description are to be regarded as illustrative in nature and not restrictive. Like reference numerals designate like elements throughout the specification. In addition, in the accompanying drawings, some constituent elements are exaggerated, omitted, or schematically shown, and the size of each constituent element does not fully reflect the actual size.

The attached drawing is only for easy understanding of the embodiment disclosed in the present specification, and the technical idea disclosed in this specification is not limited by the attached drawing, and it should be understood to include all changes and equivalents included in the spirit and technical range of the present invention.

Terms including ordinal numbers such as first, second, and the like may be used to describe various configurations elements, but the constituent elements are not limited by the terms. The terms are only used for the purpose of distinguishing one constituent element from another.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, throughout the specification, the word "on" a target element will be understood to mean positioned above or below the target element, and will not necessarily be understood to mean positioned "at an upper side" based on an opposite to gravity direction.

In the present application, terms such as "comprise" or "include" are intended to designate the existence of features, numbers, steps, operations, constituent elements, parts, or combinations thereof described in the specification, and it is to be understood that this does not preclude in advance the possibility of the presence or addition of one or more other features or numbers, steps, actions, constituent elements, parts or combinations thereof. Unless defined otherwise, all terms used herein, including technical or scientific terms, have the same meaning as commonly understood by a person of an ordinary skill in the art to which the present invention belongs.

Further, throughout the specification, the phrase "on a plane" means viewing a target portion from the top, and the phrase "on a cross-section" means viewing a cross-section formed by vertically cutting a target portion from the side.

In addition, throughout the specification, when "connected to" in the entire specification, this does not only mean that two or more constituent elements are directly connected, but also means t that two or more constituent elements are indirectly connected, physically connected, and electrically connected through other constituent elements, or being referred to by different names depending on the position or function, while being integral.

Figure 2:
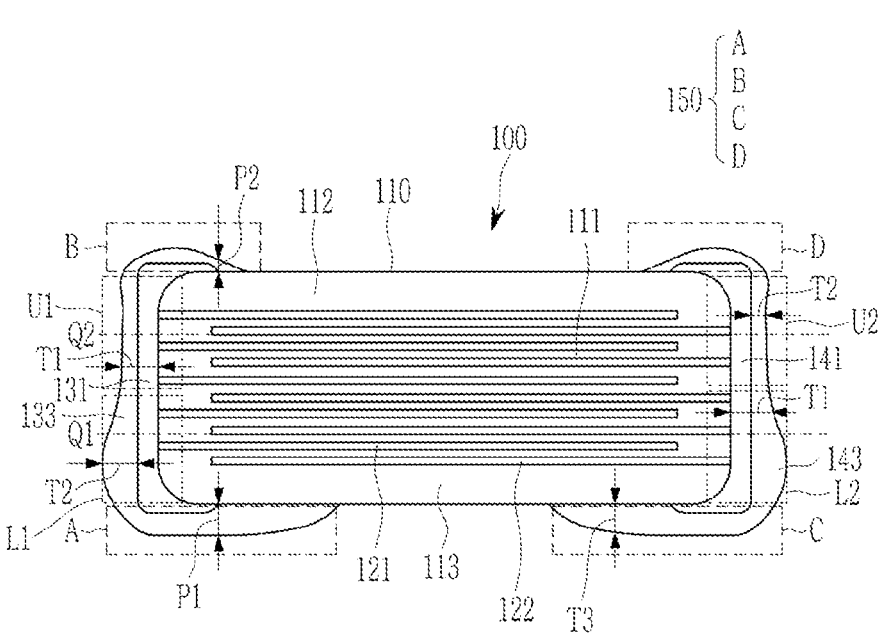
FIG. 2 is a cross-sectional view of a multilayer capacitor shown in FIG. 1 taken along a line II-II'.
Figure 3:
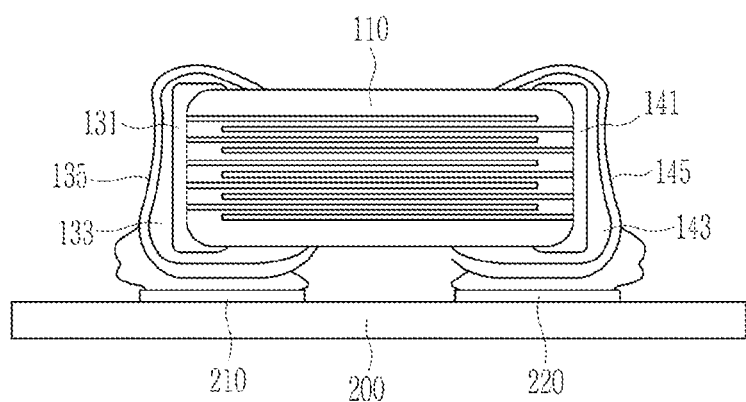
FIG. 3 is a cross-sectional view showing that a multilayer capacitor shown in FIG. 2 is mounted on a substrate.

FIG. 1 is a perspective view showing an appearance of a multilayer capacitor according to an exemplary embodiment. FIG. 2 is a cross-sectional view of a multilayer capacitor shown in FIG. 1 taken along a line II-II'. FIG. 3 is a cross-sectional view showing that a multilayer capacitor shown in FIG. 2 is mounted on a substrate.

If directions are defined to clearly explain the present embodiment, an L-axis, a W-axis, and a T-axis shown in the drawing represent axes extending to the length direction, the width direction, and the thickness direction of the capacitor body 110, respectively. Here, the thickness direction (the T-axis direction) may be a direction vertical to the wide surface of the constituent elements of the sheet shape, and may be used as the same concept as the stacking direction in which the dielectric layer 111 is stacked, for example. The length direction (the L-axis direction) is a direction that extends parallel to the wide surface of the constituent elements of the sheet shape, and may be a direction that is approximately vertical with the thickness direction (the T-axis direction), for example, it may be a direction in which a first external electrode 130 and a second external electrode 140 are positioned on both sides. The width direction (the W-axis direction) is a direction extending parallel to the wide surface of the constituent elements of the sheet shape, and may be a direction perpendicular the thickness direction (the T-axis direction) and the length direction (the L-axis direction), for example, it may be a direction in which the first external electrode 130 and the second external electrode 140 are not positioned on both sides.

Referring to FIG. 1 and FIG. 2, the multilayer capacitor 100 according to the present exemplary embodiment may include a first external electrode 130 and a second external electrode 140 positioned on opposite sides of the capacitor body 110 in the L-axis direction.

The capacitor body 110 may be made of an approximately hexahedral shape having a predetermined size of thickness, length, and width along directions intersecting each other, but the present invention but is not limited thereto.

In the present exemplary embodiment, for better understanding and ease of description, in the capacitor body 110, two surfaces facing each other in the thickness direction (the T-axis direction) are defined as a first surface and a second surface, two surfaces connected to the first surface and the second surface and facing each other in the length direction (the L-axis direction) are defined as a third surface and a fourth surface, and two surfaces connected to the first surface and second surface and connected to the third surface and the fourth surface, and facing each other in the width direction (the W-axis direction) are defined as a fifth surface and a sixth surface. In FIG. 1 and FIG. 2, the first surface shown as a lower surface in FIG. 2 may be a surface facing a mounting direction.

The shape and dimensions of the capacitor body 110, and the number of stacks the dielectric layer 111 are not limited to those shown in the drawing of the present exemplary embodiment.

The capacitor body 110 is obtained by stacking a plurality of dielectric layers 111 in the thickness direction (the T-axis direction) and then sintering them, and includes the plurality of dielectric layer 111, and a first internal electrode 121 and a second internal electrode 122 that are alternately arranged in the thickness direction (the T-axis direction) with the dielectric layer 111 interposed therebetween. In this case, the first internal electrode 121 and the second internal electrode 122 may have different polarities.

Each boundary between the dielectric layers 111 adjacent to each other of the capacitor body 11 may be integrated to an extent that it is difficult to confirm without using a scanning electron microscope (SEM).

The capacitor body 110 may include an active region and cover regions 112 and 113.

The active region is a part that contributes to the formation of the capacitance of the multilayer capacitor 100. For example, the active region may be a region in which the first internal electrode 121 or the second internal electrode 122 stacked along the thickness direction (the T-axis direction) overlaps.

The cover regions 112 and 113 may be positioned on the first surface and second surface sides of the active region in the thickness direction (the T-axis direction) as a thickness direction margin portion. These cover regions 112 and 113 may be that a single dielectric layer 111 or two or more dielectric layers 111 is stacked on the upper and lower surfaces of the active region, respectively.

The capacitor body 110 may further include a side cover region. The side cover region may be positioned on the fifth surface and the sixth surface sides of the active region in the width direction (the W-axis direction) as a width direction margin part. The side cover region, when a conductive paste layer for forming the internal electrode is applied to the surface of a dielectric green sheet, may be formed by applying a conductive paste layer only to a part of the surface of the dielectric green sheet, stacking dielectric green sheets without applying a conductive paste layer on both sides of the surface of the dielectric green sheet, and then sintering them.

The cover regions 112 and 113 and the side cover region serve to prevent a damage to the first internal electrode 121 and the second internal electrode 122 due to a physical or chemical stress.

In the dielectric layer 111, along with a ceramic powder, ceramic additives, organic solvents, plasticizers, binders, and dispersants may be further added. As the ceramic additives, for example, transition metal oxide or transition metal carbide, rare earth elements, magnesium (Mg) or aluminum (Al), etc. may be used.

For example, an average thickness of one or each dielectric layer 111 may be 0.5 μm to 10 μm.

The first internal electrode 121 and the second internal electrode 122 are alternately arranged to face each other along the thickness direction (the T-axis direction) with the dielectric layer 111 interposed therebetween, and the first internal electrode 121 and the second internal electrode 122 may be electrically insulated from each other by the dielectric layer 111 disposed therebetween.

The end parts of the first and second internal electrodes 121 and 122 alternately exposed through the third and fourth surfaces of the capacitor body 110 may be electrically connected to the first and second external electrodes 130 and 140, respectively.

The first and second internal electrodes 121 and 122 include a conductive metal, for example, a metal such as Ni, Cu, Ag, Pd, or Au, or an alloy thereof, such as an Ag—Pd alloy. Also, the first and second internal electrodes 121 and 122 may include dielectric particles having the same composition as the ceramic material included in the dielectric layer 111.

For example, the average thickness of one or each of the first and second internal electrodes 121 and 122 may be 0.1 μm to 2 μm.

According to the configuration above, when predetermined voltages are applied to the first and second external electrodes 130 and 140, charge is accumulated between the first and second internal electrodes 121 and 122 facing each other. At this time, the capacitance of the multilayer capacitor 100 is proportional to the overlapping area of the first and second internal electrodes 121 and 122 stacked along the thickness direction (the T-axis direction) in the active region.

The first external electrode 130 and the second external electrode 140 are provided with voltages of different polarities, and may be electrically connected to exposed portions of the first internal electrode 121 and the second internal electrode 122, respectively.

The first external electrode 130 and the second external electrode 140 may include connection portions U1, U2, L1, and L2 and a band portion 150, respectively. The connection portions U1, U2, L1, and L2 may include first connection portions U1 and L1 and second connection portions U2 and L2, and the band portion 150 may include first band portions A and B and second band portions C and D.

The first external electrode 130 may include the first connection portions U1 and L1 positioned on the third surface of the capacitor body 110, and the first band portions A and B extending from the first connection portions U1 and L1 to the first surface and the second surface. The second external electrode 140 includes second connection portions U2 and L2 positioned on the fourth surface of capacitor body 110, and second band portions C and D extending from the second connection portion U2 and L2 to the first surface and second surface.

In order to clearly explain the present embodiment, hereinafter, the connection portions U1, U2, L1 and L2 are divided into the lower portions L1 and L2 close to the first surface and the upper portions U1 and U2 close to the second surface with reference to the middle point between the first surface and the second surface. This is the same for not only the external electrodes 133 and 140, but also the case of the base electrode 131 and 141 included in the external electrodes 133 and 140 and the conductive resin layer 133 and 143.

In addition, unless otherwise stated, the expression related to the thickness of the layer expressed below may mean to be measured in a vertical direction from the surface of one layer until another layer appears. For example, the thickness of the external electrodes 130 and 140 is measured from the surface of the capacitor body 110 to the outer surface of the external electrodes 130 and 140 in the vertical direction, and the thickness of the conductive resin layers 133 and 143 is measured from the outer surface of the conductive resin layers 133 and 143 to the outer surface of the surface electrodes 131 and 141 in the vertical direction, or to the surface of the capacitor body 110 when there is no surface electrodes 131 and 141 in the vertical direction.

On the connection portions U1, U2, L1, and L2 of the first external electrode 130 and the second external electrode 140, the upper portions U1 and U2, and the lower portions L1 and L2 may be formed asymmetrically. The external electrodes 130 and 140 may have the different thicknesses T1 of the upper portions U1 and U2 and the lower portions L1 and L2. At this time, the thickness T1 of the external electrodes 130 and 140 may be a thickness measured from the surface of the capacitor body 110 to the outer surface of each of the first external electrode 130 and the second external electrode 140 in the vertical direction. In the connection portions U1, U2, L1, and L2 of the first and second external electrodes 130 and 140, the thickness of the lower portions L1 and L2 may be thicker than the thickness of the upper portions U1 and U2. For example, the thickness of the lower portion L1 may be thicker than the thickness of the upper portion U1, and the thickness of the lower portion L2 may be thicker than the thickness of the upper portion U2. The comparison reference of the thickness may be the maximum thickness of each of the lower portions L1 and L2 and the upper portions U1 and U2. For example, if the maximum thickness of the lower portions L1 and L2 is greater than the maximum thickness of the upper portions U1 and U2, it may be determined that the lower portions L1 and L2 are thicker than the upper portions U1 and U2. Or if the maximum thickness of the lower portion L1 is greater than the maximum thickness of the upper portion U1, it may be determined that the lower portion L1 is thicker than the upper portion U1, and if the maximum thickness of the lower portion L2 is greater than the maximum thickness of the upper portion U2, it may be determined that the lower portion L2 is thicker than the upper portion U2.

In addition, the comparison reference for the thickness may be the thickness T1 of the external electrodes 130 and 140 at a specific point. For example, when quartering the connection portions U1, U2, L1, and L2 between the first surface and the second surface, the thickness T1 of the external electrodes 130 and 140 at a quartering point Q1 close to the first surface and the thickness T1 of the external electrodes 130 and 140 at a quartering point Q2 close to the second surface may be measured. For example, if the thickness T1 of the external electrodes 130 and 140 at the quartering point Q1 close to the first surface is thicker than the thickness T1 of the external electrodes 130 and 140 at the quartering point Q2 close to the second surface, it may be determined that the lower portions L1 and L2 are thicker than the upper portions U1 and U2.

The connection portions U1, U2, L1, and L2 of the first external electrode 130 and the second external electrode 140 may be formed to gradually become thicker from the second surface to the first surface direction. When forming the external electrode, it may be affected by gravity so that some of the external electrode component materials migrate downward naturally and harden. In this case, in the connection portions U1, U2, L1, and L2, a shape gradually thickening from upper portions U1 and U2 to the lower portions L1 and L2 may be formed as at least partial.

In the length measured in the length direction (the L-axis direction) of the band portions A, B, C, and D, the length of the band portions A and C on the first surface may be equal to or longer than the length of the band portions B and D on the second surface. For example, the length of the band portion A on the first surface may be equal to or longer than the length of the band portion B on the second surface, and the length of the band portion C on the first surface may be equal to or longer than the length of the band portion D on the second surface. That is, in the length of the first external electrode 130 and the second external electrode 140 measured in the length direction (the L-axis direction), the length of the external electrodes 130 and 140 on the first surface may be equal to or longer than the length of the external electrodes 130 and 140 on the second surface.

The first and second external electrodes 130 and 140 may include base electrodes 131 and 141 and conductive resin layers 133 and 143, respectively. That is, the first external electrode 130 may include a first base electrode 131 and a first conductive resin layer 133, and the second external electrode 140 may include a second base electrode 141 and a second conductive resin layer 143.

The first base electrode 131 may be positioned to be in contact with the third surface of the capacitor body 110 and connected to the first internal electrode 121, and the second base electrode 141 may be positioned to be in contact with the fourth surface of the capacitor body 110 and connected to the second internal electrode 122.

The first base electrode 131 and the second base electrode 141 may include copper (Cu). In addition, the first base electrode 131 and the second base electrode 141 include copper (Cu) as a main component, and may include at least one of nickel (Ni), tin (Sn), palladium (Pd), platinum (Pt), gold (Au), silver (Ag), tungsten (W), titanium (Ti), lead (Pb), or these alloys and glass.

For example, in the formation method of the first base electrode 131 and the second base electrode 141, they may be formed by dipping the capacitor body 110 into a conductive paste including the conductive metal and glass, printing the conductive paste on the surface of the capacitor body 110 by a screen printing method or a gravure printing method, applying the conductive paste to the surface of the capacitor body 110, or transferring a dry film obtained by drying the conductive paste onto the capacitor body 110.

By forming the first base electrode 131 and the second base electrode 141 with the aforementioned conductive paste, while maintaining a sufficient conductivity, a penetration of a plating solution and/or an external moisture may be effectively suppressed by increasing the density of the first external electrode 130 and the second external electrode 140 due to the added glass.

For example, the glass component included in the first base electrode 131 and the second base electrode 141 may be a mixture of oxides, and may be at least one selected from a group consisting of silicon oxide, boron oxide, aluminum oxide, transition metal oxide, alkali metal oxide and alkaline earth metal oxide. The transition metal may be one or more selected from a group consisting of zinc (Zn), titanium (Ti), copper (Cu), vanadium (V), manganese (Mn), iron (Fe) and nickel (Ni), and the alkali metal is lithium (Li), sodium (Na) and potassium (K), and the alkaline earth metal may be one or more selected from a group consisting of magnesium (Mg), calcium (Ca), strontium (Sr) and barium (Ba).

The first conductive resin layer 133 and the second conductive resin layer 143 may be formed to at least partially cover the first base electrode 131 and the second base electrode 141, or may completely cover the first base electrode 131 and the second base electrode 141.

In the connection portions U1, U2, L1, and L2, the first conductive resin layer 133 and the second conductive resin layer 143 may have the lower portions L1 and L2 and the upper portions U1 and U2 formed asymmetrically. The lower portions L1 and L2 and the upper portions U1 and U2 of the conductive resin layer 143 may have different thicknesses T2. At this time, the thickness T2 of the conductive resin layer 143 of the connection portions U1, U2, L1, and L2 may be the thickness measured to the outer surface of the first and second conductive resin layers 133 and 143 in the vertical direction from the outer surface of the first and second base electrodes 131 and 141. In detail, in the connection portions U1, U2, L1, and L2, as for the thickness of the conductive resin layers 133 and 143, the thickness of the lower portions L1 and L2 may be thicker than the thickness of the upper portions U1 and U2. The comparison reference of the thickness may be the maximum thickness of the conductive resin layers 133 and 143 of the lower portions L1 and L2 and the upper portions U1 and U2, respectively. For example, if the maximum thickness of conductive resin layers 133 and 143 is greater in the lower portions L1 and L2 than in the upper portions U1 and U2, it may be determined that the conductive resin layers 133 and 143 are thicker in the lower portions L1 and L2.

In addition, the comparison reference of the thickness may be the thickness T2 of the conductive resin layers 133 and 143 at a specific point. For example, when quartering the conductive resin layers 133 and 143 between the first surface and the second surface, for the thickness of the conductive resin layers 133 and 143 of the connection portions U1, U2, L1, and L2, the thickness T2 at the quartering point Q1 close to the first surface may be thicker than thickness T2 at the quartering point Q2 close to the second surface. In this case, it may be determined that the conductive resin layers 133 and 143 are thicker in the lower portions L1 and L2 than in the upper portions U1 and U2.

The conductive resin layers 133, and 143 may be formed to gradually increase in the thickness from the upper portions U1 and U2 to the lower portions L1 and L2. During the curing process of the conductive resin layers 133 and 143, the component material may migrate partially naturally under the influence of gravity. At this time, a shape gradually thickening from the upper portions U1 and U2 to the lower portions L1 and L2 may be formed as at least partial.

The conductive resin layers 133 and 143 may constitute some of the band portions A, B, C, and D of the external electrodes 130 and 140. The conductive resin layers 133 and 143 extend from the connection portions U1, U2, L1, and L2 to the first surface and the second surface, thereby forming the band portions A, B, C, and D.

In the band portions A, B, C, and D, the conductive resin layers 133 and 143 of the first and second surfaces can be formed asymmetrically. For the conductive resin layers 133 and 143, the thickness measured on the first surface and the thickness measured on the second surface may be different. For example, the thickness P1 of the conductive resin layers 133 and 143 measured at the end part of base electrodes 131 and 141 of the first surface and the thickness P2 of the conductive resin layers 133 and 143 measured at the end part of the base electrodes 131 and 141 of the second surface may be different from each other. At this time, the thickness P1 and P2 of the conductive resin layers 133 and 143 may be measured from the surface of the capacitor body 110 of the first surface and the second surface to the outer surface of the conductive resin layers 133 and 143 in a vertical direction.

In addition, in the length measured in the length direction (the L-axis direction) of the conductive resin layers 133 and 143, the length extending to the first surface may be equal to or longer than the length extending to the second surface.

Referring to FIG. 3, when mounting the multilayer capacitor 100 according to an exemplary embodiment on the substrate in the first surface direction, if the band portions of the external electrodes 130 and 140 are extended to the first surface, the distance between the electrode pads 210 and 220 may be reduced. At this time, if the conductive resin layers 133 and 143 of the band portion are extended to the first surface, even if the base electrodes 131 and 141 of the band portion are not formed long, the distance between the electrode pads 210 and 220 may be sufficiently reduced.

In the band portion of the first surface, the conductive resin layers 133 and 143 may be at least partially formed in a shape substantially parallel to the first surface of the capacitor body 110.

The conductive resin layers 133 and 143 may be formed of a conductive resin composition including an epoxy resin, a conductive metal particle, and a hardener. This conductive metal particle may include a copper particle, and the surface may be coated with silver if necessary. Here, the hardener plays a role in connecting resins having an epoxy functionality group, and whenever the epoxy resin is used, the hardener may be mixed and used, and one-component type with the hardener mixed in advance may be used. A latent hardener may be used as a hardener used when producing the one-component type epoxy resin, and it may play the role of the hardener when being controlled by an external heating, UV, or intake. The latent hardeners may include amine and imidazole-based materials, and may use epoxy paste using positive ionic hardeners such as onium salts, sulfonium salts, phosphonium salts, and active esters of polyvalent carbon acids, phenolic hardeners or anhydride hardeners.

For example, it may be applied in the form of a paste in which conductive metal particles such as Cu, Ag, and Ag-coated Cu are added to epoxy, hardener, and other additives. Hereinafter, a manufacturing method of the multilayer capacitor according to the present exemplary embodiment will be described.

A plurality of dielectric green sheets is prepared. The dielectric green sheet becomes a dielectric layer 111 of a capacitor body 110 after being sintered.

For the dielectric green sheet, a paste may be formed by mixing ceramic powder, ceramic additives, organic solvent, plasticizer, binder and dispersant, and then the paste may be manufactured into a sheet shape of several μm thickness through a method such as such as a doctor blade or a screen printing.

For example, the ceramic powder may include dielectric ceramic including components such as $BaTiO_3$, $CaTiO_3$, $SrTiO_3$, or $CaZrO_3$. In addition, auxiliary components such as Mn compound, Fe compound, Cr compound, Co compound, and Ni compound may be further included in these components. For example, $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which Ca, Zr, etc. are partially employed in $BaTiO_3$-based dielectric ceramic, etc. may be included.

As ceramic additives, for example, a transition metal oxide or a transition metal carbide, a rare earth element, magnesium (Mg) or aluminum (Al) may be used.

A conductive paste layer is formed on the dielectric green sheet surface. The conductive paste layer may form first and second internal electrodes 121 and 122 after sintering.

The conductive paste layer may be formed by applying a conductive paste including a conductive metal to the surface of the dielectric green sheet using a method such as a doctor blade or a screen printing.

The conductive metal may include, for example, a metal such as Ni, Cu, Ag, Pd, or Au or an alloy thereof, such as an Ag—Pd alloy.

For example, a first conductive paste layer may be applied to a first dielectric green sheet surface as a first pattern, and a second conductive paste layer may be coated to a second dielectric green sheet surface as a second pattern. The first pattern and the second pattern may be aligned such that when the first and second dielectric green sheets are alternately stacked, some of the first and second conductive paste layers overlap and some do not overlap.

A dielectric green sheet stack is manufactured by stacking first and second dielectric green sheets. The first and second dielectric green sheets are stacked so that the first and second conductive paste layers overlap, but at least partially do not overlap.

Optionally, the dielectric green sheet stack is pressed.

The dielectric green sheet stack may be cut so that the first and second conductive paste layers are exposed through both end part surfaces, respectively. In each of the internal electrodes of the first and second internal electrodes 121 and 122, the end part may be exposed to one of both end part surfaces of the dielectric green sheet stack.

The dielectric green sheet stack is sintered at high temperature to manufacture the capacitor body 110. After the sintering, the dielectric green sheet forms the dielectric layer 111. The conductive paste layer formed on the dielectric green sheet surface forms the first and second internal electrodes 121 and 122 by the sintering, and may be alternately arranged with one dielectric layer 111 interposed therebetween. The first and second internal electrodes 121 and 122 may be electrically insulated from each other by the dielectric layer 111.

First and second base electrodes 131 and 141 are formed on both cross-sections where the first and second internal electrodes 121 and 122 of the capacitor body 100 are exposed, respectively. The first and second base electrodes 131 and 141 may be formed by dipping the capacitor body 110 into a conductive paste including a conductive metal. As another example, the first and second base electrodes 131 and 141 may be formed by printing the conductive paste on the surface of the capacitor body 110 by a screen printing or a gravure printing, applying the conductive paste to the surface of the capacitor body 110, or transferring a dry film that the conductive paste is dried onto the capacitor body 110.

Figure 4:
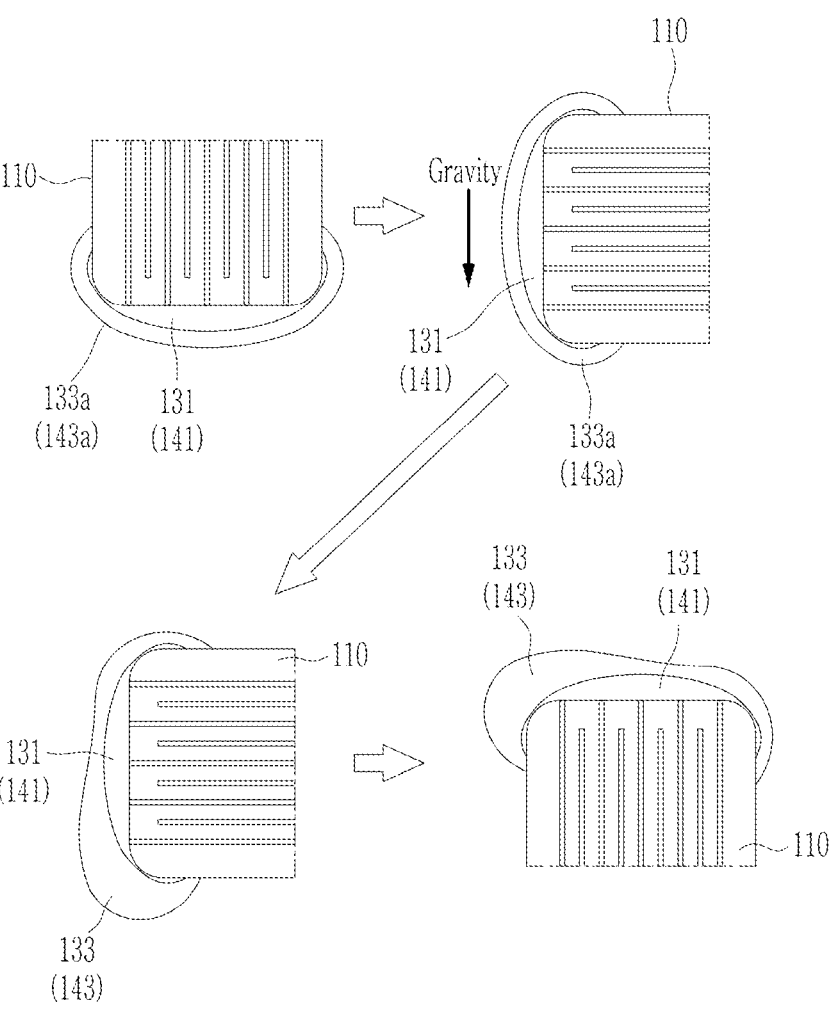
FIG. 4 is a view showing a method of forming a conductive resin layer by hardening a paste formed on a base electrode in a manufacturing method of a multilayer capacitor according to an exemplary embodiment.
Figure 5:
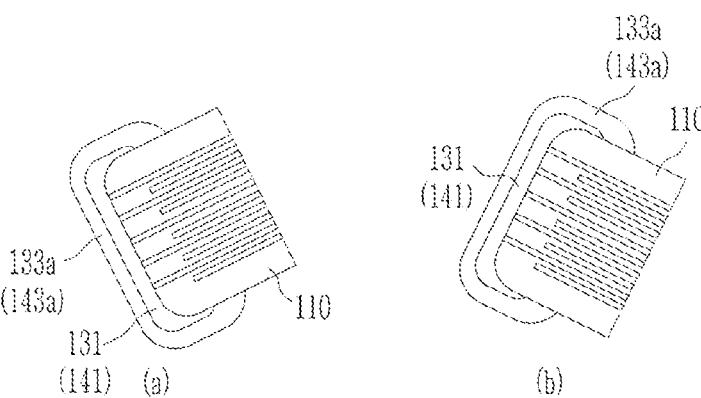
FIG. 5 is a view showing another exemplary embodiment of hardening a paste in a manufacturing method of a multilayer capacitor in FIG. 4.

FIG. 4 is a view showing a method of forming a conductive resin layer by hardening a paste formed on a base electrode in a manufacturing method of a multilayer capacitor according to an exemplary embodiment. FIG. 5 is a view showing another exemplary embodiment of hardening a paste in a manufacturing method of a multilayer capacitor in FIG. 4. A method of forming first and second external electrodes 130 and 140 including first and second conductive resin layers 133 and 143 respectively formed outside the first and second base electrodes 131 and 141 is descried with reference to FIG. 4 and FIG. 5.

A layer of an uncured paste for resin layer 133*a* is formed by dipping the capacitor body 110 on which the first and second base electrodes 131 and 141 are formed into a paste including an epoxy resin and conductive metal particles, or applying this paste to the surface of the capacitor body 110 on which the base electrodes 131 and 141 are formed.

When curing the uncured paste for conductive resin layer 133a, it may be positioned to be dried so that the first surface faces the direction of gravity. Also, as shown in FIG. 5, It may be dried by adjusting the slope so that the first surface forms an acute angle with the direction of gravity. That is, the uncured paste for conductive resin layer 133a may be cured by tilting the capacitor body 110 applied with the uncured paste for conductive resin layer 133a so that the dielectric layer 111 intersects the direction of gravity. For example, as shown in FIG. 4, the uncured paste for conductive resin layer 133a may be hardened by tilting the dielectric layer 111 vertically to the direction of gravity.

The uncured paste for conductive resin layer 133a partially migrates in the direction of gravity according to conditions such as viscosity and temperature, so that the lower part of the conductive resin layers 133 and 143 of the connection portions U1, U2, L1, and L2 is thicker than the upper part.

For the conductive resin layers 133 and 143 of the band portions A, B, C, and D, the band portion of the first surface may be formed longer and thicker than the band portion of the second surface.

By controlling the curing conditions, the thickness of the conductive resin layers 133 and 143 of the connection portions U1, U2, L1, and L2, and the thickness and length of the conductive resin layers 133 and 143 of the band portions A, B, C, and D may be adjusted. For example, by controlling the drying temperature, the drying time, the temperature holding time, etc., a thickness ratio of the upper portions U1 and U2 and the lower portions L1 and L2 of the conductive resin layers 133 and 143 of the connection portions U1, U2, L1, and L2 and/or a thickness ratio of the conductive resin layers 133 and 143 of the first surface and the second surface in the band portions A, B, C, and D may be adjusted.

The appropriateness of the thickness ratio of the upper portions U1 and U2 and the lower portions L1 and L2 of the conductive resin layers 133 and 143 of the connection portions U1, U2, L1, and L2 may be determined based on the maximum value of the thickness of the upper portions U1 and U2 and the lower portions L1 and L2.

Figure 6:
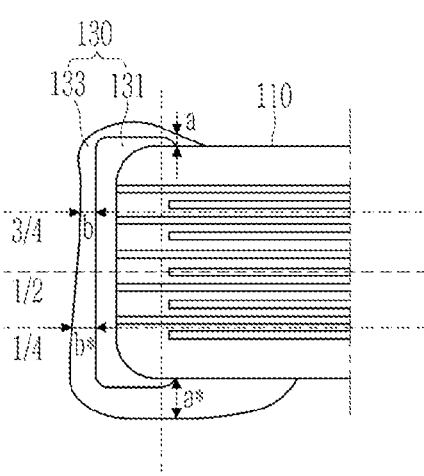
FIG. 6 is a view showing a reference point for measuring a thickness to determine an appropriateness of a conductive resin layer in a manufacturing method of a multilayer capacitor of FIG. 4.

FIG. 6 is a view showing a reference point for measuring a thickness to determine an appropriateness of a conductive resin layer in a manufacturing method of a multilayer capacitor of FIG. 4.

Referring to FIG. 6, whether the thickness ratio of the upper portion U1 and the lower portion L1 of the conductive resin layer 133 in the connection portions U1 and L1 of the external electrode 130 is appropriate may be determined by measuring the thickness of a specific point. For example, by quartering the connection portions U1, U2, L1, and L2, the thickness (b*) measured at the quartering point close to the first surface is used as a thickness of the conductive resin layer 133 of the lower portion L1, and the thickness (b) measured at the quartering point close to the second surface is used as a thickness of the conductive resin layer 133 of the upper portion U1, it may be determined by the ratio of two thicknesses.

Experimental Example 1

For Samsung Electro-Mechanics' 32Y106 mass production model, 200 multilayer capacitors in which conductive resin layers 133 and 143 of external electrodes 130 and 140 are formed in a general symmetrical structure (a comparative example 1), and 200 multilayer capacitors (exemplary embodiments 1 and 2) in which thicknesses of upper portions U1 and U2 and lower portions L1 and L2 are asymmetrical in connection portion of conductive resin layers 133 and 143 were prepared, respectively. The multilayer capacitor used in the experiment was manufactured under the same conditions except that the thickness ratio of the conductive resin layers 133 and 143 was different in the upper portions U1 and U2 and the lower portions L1 and L2.

TABLE 1

| Evaluation items | Equivalent Series Resistance (ESR) | |
|---|---|---|
| Thickness relationship for position | Initial value (mΩ, average) | After TC100 (mΩ, average) |
| b*/b = 1 (Comparative Example 1) | 13.1 | 13.8 |
| 1 < b*/b ≤ 2 (exemplary embodiment 1) | 12.8 | 13.4 |
| 2 < b*/b ≤ 3 (exemplary embodiment 2) | 11.8 | 12.2 |

Table 1 shows a result of measuring and comparing an initial equivalent series resistance (ESR) and an equivalent series resistance (ESR) after 100 temperature cycles (TC) after dividing the prepared multilayer capacitors into three groups and mounting them on a substrate, respectively.

The multilayer capacitor in which the conductive resin layers 133 and 143 are formed with a general symmetrical structure is classified as a comparative example 1. The connection portion of the conductive resin layers 133 and 143 is quartered, and the thickness (b*) measured at the quartering point close to the first surface and the thickness (b) measured at the quartering point close to the second surface are measured, and the exemplary embodiments were classified into two groups according to the ratio thereof. That is, the group in which b*/b is greater than 1 and less than or equal to 2 is classified as an exemplary embodiment 1, and the group in which b*/b is greater than 2 and less than or equal to 3 is classified as an exemplary embodiment 2.

As shown in Table 1, it was confirmed that the initial value of the equivalent series resistance (ESR) gradually decreased as the lower thickness became thicker than the upper thickness of the conductive resin layers 133 and 143. In addition, as may be seen from the change in the equivalent series resistance (ESR) after TC100, it was confirmed that the resistance also increased.

Experimental Example 2

For Samsung Electro-Mechanics' 32Y106 mass production model, 60 multilayer capacitors in which conductive resin layers 133 and 143 of external electrodes 130 and 140 are formed in a general symmetrical structure (a comparative example 2), and 60 multilayer capacitors (exemplary embodiments 3 and 4) in which the conductive resin layers 133 and 143 of the external electrodes 130 and 140 formed on the first surface of the capacitor body are thicker than the conductive resin layers 133 and 143 formed on the second surface were prepared. The comparative example 2 and the example embodiments 3 and 4 were manufactured under the same condition except that the thicknesses of the conductive resin layers 133 and 143 on the first and second surfaces of the capacitor body were different.

TABLE 2

| Evaluation items Thickness relationship by position | Bending strength evaluation Crack occurrence frequency (n = 50 ea) |
|---|---|
| a*/a = 1 (Comparative Example 2) | 4 |
| 1 < a*/a ≤ 1.5 (exemplary embodiment 3) | 2 |
| 1.5 < a*/a ≤ 2 (exemplary embodiment 4) | 0 |

Table 2 shows test results for evaluating the bending strength of the substrate on which the prepared multilayer capacitor is mounted. The experiment was conducted by a method of artificially bending the substrate on which the multilayer capacitor is mounted by 10 mm and then repeating measuring the frequency of the crack occurrence by 50 times (n=50ea).

The prepared multilayer capacitors were classified into 3 groups. The multilayer capacitor with a general symmetric structure is classified as the comparative example 2. The thickness a* of the conductive resin layers 133 and 143 at the end part of the base electrodes 131 and 141 of the first surface of the capacitor body 110 is measured, the thickness a of the conductive resin layers 133 and 143 at the end part of the base electrodes 131 and 141 of the second surface is measured, and the experimental groups were classified into two groups according to the ratio thereof. That is, the group in which a*/a is greater than 1 and less than or equal to 1.5 is classified as the exemplary embodiment 3, and the group in which a*/a is greater than 1.5 and less than or equal to 2 is classified as the exemplary embodiment 4.

As shown in Table 2, it was confirmed that the crack occurrence frequency decreased as the thickness on the first surface became thicker compared to the thickness on the second surface for the conductive resin layers 133 and 143 of the external electrodes 130 and 140. That is, it was confirmed that the bending strength increased as the thickness of the conductive resin layers 133 and 143 of the first surface became thicker.

Although the preferred exemplary embodiment of the present invention is described through the above description, but the present invention is not limited thereto and various modifications can be made within the claims and the range of the detailed description and the accompanying drawings of the invention, and this also belongs to the scope of the present invention, of course.

What is claimed is:

1. A multilayer capacitor comprising:
a capacitor body including a dielectric layer, and a first internal electrode and a second internal electrode stacked in a thickness direction with the dielectric layer interposed therebetween, a length direction vertical to the thickness direction, and a width direction vertical to the thickness direction and the length direction, the capacitor body having a first surface and a second surface opposite each other in the thickness direction, a third surface and a fourth surface opposite each other in the length direction, and a fifth surface and a sixth surface opposite each other in the width direction; and
first and second external electrodes respectively including a connection portion disposed at the third surface and the fourth surface of the capacitor body, and a band portion extending from the connection portion to the first surface and the second surface, wherein the first and second external electrodes comprise a base electrode in contact with the capacitor body, and a conductive resin layer disposed to cover the base electrode at least partially, respectively,
a thickness of the conductive resin layer at an end part of the base electrode on the first surface measured in a vertical direction with respect to the first surface, and a thickness of the conductive resin layer at an end part of the base electrode on the second surface measured in a vertical direction with respect to the second surface are different from each other, and
the conductive resin layer covers a portion of each of the fifth surface and the sixth surface and extends continuously from the portion of the fifth surface to the portion of the sixth surface to cover a portion of the first surface and a portion of the second surface.

2. The multilayer capacitor of claim 1, wherein:
a length of the band portion on the first surface measured in the length direction is greater than or equal to a length of the band portion on the second surface measured in the length direction.

3. The multilayer capacitor of claim 2, wherein:
a length of the conductive resin layer of the band portion at the first surface measured in the length direction is greater than or equal to a length of the conductive resin layer of the band portion at the second surface measured in the length direction.

4. The multilayer capacitor of claim 1, wherein:
the thickness of the conductive resin layer at the end part of the base electrode on the first surface measured in the vertical direction with respect to the first surface is thicker than the thickness of the conductive resin layer at the end part of the base electrode on the second surface measured in the vertical direction with respect to the second surface.

5. The multilayer capacitor of claim 4, wherein:
the thickness of the conductive resin layer at the end part of the base electrode on the first surface is thicker than 1.5 times and thinner than or equal to 2 times of the thickness of the conductive resin layer at the end part of the base electrode on the second surface.

6. The multilayer capacitor of claim 1, wherein:
the connection portion of the first or second external electrode includes a lower portion close to the first surface and an upper portion close to the second surface, bounded by a middle point between the first surface and the second surface, and
a thickness of the lower portion measured in a vertical direction with respect to the third or fourth surface where the first or second external electrode is disposed and a thickness of the upper portion measured in the vertical direction with respect to the third or fourth surface where the first or second external electrode is disposed are different from each other.

7. The multilayer capacitor of claim 6, wherein:
the connection portion of the first or second external electrode includes quarters between the first surface and the second surface, and a thickness of the connection portion of the first or second external electrode at a quarter point close to the first surface is thicker than a thickness of the connection portion of the first or second external electrode at another quarter point close to the second surface.

8. The multilayer capacitor of claim 7, wherein:
the connection portion has a part having a thickness increasing from the upper portion to the lower portion.

9. The multilayer capacitor of claim 6, wherein:

a thickness of the conductive resin layer of the lower portion measured in the vertical direction with respect to the third or fourth surface where the first or second external electrode is disposed and a thickness of the conductive resin layer of the upper portion measured in the vertical direction with respect to the third or fourth surface where the first or second external electrode is disposed are different from each other.

10. The multilayer capacitor of claim 9, wherein:

the conductive resin layer of the connection portion includes quarters between the first surface and the second surface, and the conductive resin layer of the connection portion is thicker at a quartering point close to the first surface than at a quartering point close to the second surface.

11. The multilayer capacitor of claim 10, wherein:

the conductive resin layer of the connection portion has a portion having a thickness increasing from the upper portion to the lower portion.

12. The multilayer capacitor of claim 9, wherein:

the conductive resin layer has a thickness at a quartering point close to the first surface more than twice as a thickness at a quartering point close to the second surface and less than or equal to three times as thin as the thickness at the quartering point close to the second surface.

13. The multilayer capacitor of claim 1, wherein:

the conductive resin layer includes conductive metal particles dispersed in a resin.

14. The multilayer capacitor of claim 13, wherein:

the base electrode includes a conductive metal and glass.

15. A multilayer capacitor comprising:

a capacitor body including a dielectric layer, and a first internal electrode and a second internal electrode stacked in a thickness direction with the dielectric layer interposed therebetween, a length direction vertical to the thickness direction, and a width direction vertical to the thickness direction and the length direction, the capacitor body having a first surface and a second surface opposite each other in the thickness direction, and a third surface and a fourth surface opposite each other in the length direction; and first and second external electrodes respectively including a connection portion disposed at the third surface and the fourth surface of the capacitor body, and a band portion extending from the connection portion to the first surface and the second surface, wherein the first and second external electrodes comprise a base electrode in contact with the capacitor body, and a conductive resin layer disposed to cover the base electrode at least partially and extending at least on portions of the first surface and the second surface, respectively, the connection portion of the first or second external electrode includes a lower portion close to the first surface and an upper portion close to the second surface, bounded by a middle point between the first surface and the second surface, a thickness, in a vertical direction with respect to the third or fourth surface, of one portion of the conductive resin layer where the first or second external electrode is disposed decreases and then increases along the thickness direction, and the one portion of the conductive resin layer having the thickness decreasing and then increasing along the thickness direction covers at least the middle point between the first surface and the second surface.

16. The multilayer capacitor of claim 15, wherein:

thickness of the conductive resin layer of the lower portion measured in the vertical direction with respect to the third or fourth surface where the first or second external electrode is disposed is greater than a thickness of the conductive resin layer of the upper portion measured in the vertical direction with respect to the third or fourth surface where the first or second external electrode is disposed.

* * * * *